(12) United States Patent
Mitchell et al.

(10) Patent No.: US 9,805,496 B2
(45) Date of Patent: Oct. 31, 2017

(54) EXAMPLE BASED EDITING OF VIRTUAL TERRAIN MAPS

(71) Applicant: Disney Enterprises, Inc., Burbank, CA (US)

(72) Inventors: Kenneth Mitchell, Earlston (GB); Gwyneth Bradbury, London (GB); Tim Weyrich, Bromley (GB)

(73) Assignees: Disney Enterprises, Inc., Burbank, CA (US); University College London, London (GB)

(*) Notice: Subject to any disclaimer, the term of this patent is extended or adjusted under 35 U.S.C. 154(b) by 276 days.

(21) Appl. No.: 14/287,517

(22) Filed: May 27, 2014

(65) Prior Publication Data

US 2015/0348284 A1    Dec. 3, 2015

(51) Int. Cl.
*G06T 15/04* (2011.01)
*G06T 15/50* (2011.01)
*G06T 17/05* (2011.01)

(52) U.S. Cl.
CPC ............ *G06T 15/04* (2013.01); *G06T 15/503* (2013.01); *G06T 17/05* (2013.01)

(58) Field of Classification Search
None
See application file for complete search history.

(56) References Cited

U.S. PATENT DOCUMENTS

| | | | | |
|---|---|---|---|---|
| 2007/0195083 A1* | 8/2007 | Yoo | ........................ | G06T 15/04 345/420 |
| 2007/0255729 A1* | 11/2007 | Schiefele | ................. | G01C 3/20 |
| 2008/0166069 A1* | 7/2008 | Lin | ........................... | G06T 3/40 382/302 |
| 2009/0040386 A1* | 2/2009 | Ishiga | ....................... | G06T 5/10 348/607 |
| 2013/0121614 A1* | 5/2013 | Intwala | ................... | G06T 5/009 382/280 |

(Continued)

OTHER PUBLICATIONS

Dvornik ("Awesome Unity Texturing Terrain Tutorial", 2013, http://kostiantyn-dvornik.blogspot.com/2013/11/awesome-unity-texturing-terrain-tutorial.html.*

(Continued)

*Primary Examiner* — Kee M Tung
*Assistant Examiner* — Xin Sheng
(74) *Attorney, Agent, or Firm* — Patterson + Sheridan, LLP

(57) ABSTRACT

The disclosure provides an approach for generating virtual terrains. A terrain editing application is configured to receive assets of various types, including a blank canvas, two-dimensional (2D) sketches, real-world elevation maps, authored heightfields, etc. The assets specify characteristics of a terrain, and provide starting points for creating the virtual terrain. The editing application further provides a set of tools allowing a user to modify the virtual terrain. In one embodiment, the set of tools may include a copy-and-paste tool, a peak creation tool, a ridge creation tool, a ridge tracing tool, and a resynthesis tool. The editing application generates a new layer for each edit, as well as 2D and three-dimensional (3D) previews of the edited terrain. The editing application also provides a user-adjustable frequency decomposition of each layer. The editing application combines layers using Laplacian blending to produce the final virtual terrain.

16 Claims, 9 Drawing Sheets

(56) References Cited

U.S. PATENT DOCUMENTS

2014/0184591 A1* 7/2014 Boschker .............. G06T 15/50
                                                            345/419

OTHER PUBLICATIONS

Schneider, Jens, Tobias Boldte, and Rüdiger Westermann. "Real-time editing, synthesis, and rendering of infinite landscapes on GPUs." Vision, modeling and visualization. vol. 2006. 2006.*

Kent ("Photoshop Fundamentals: Blend Images with a Displacement Map", 2009, http://www.graphics.com/article-old/photoshop-fundamentals-blend-images-displacement-map).*

Belhadj F.; Audibert P.: "Modeling Landscapes With Ridges and Rivers". In VRST (2005), Singh G., Lau R. W. H., Chrysanthou Y., Darken R. P., (Eds.), ACM, pp. 151-154.

Burt P. J.; Edward, Adelson E. H.: "The Laplacian Pyramid as a Compact Image Code". IEEE Transactions on Communications 31 (1983), pp. 532-540.

Bidarra R.; Kraker K. J. D.; Smelik R. M.; Tutenel T.: "Integrating Semantics and Procedural Generation: Key Enabling Factors for Declarative Modeling of Virtual Worlds". In Proceedings of Focus K3D Conference on Semantic 3D Media and Content (Sophia Antipolis, France, Feb. 2010), pp. 51-55.

Bernhardt A.; Maximo A.; Velho L.; Hnaidi H.; Cani M. P.: "Real-Time Terrain Modeling Using CPU-GPU Coupled Computation". In SIBGRAPI (2011), Lewiner T., da Silva Torres R., (Eds.), IEEE, pp. 64-71.

Efros A. A.; Freeman W. T.: "Image Quilting for Texture Synthesis and Transer". In Proceedings of the 28th Annual Conference on Computer Graphics and Interactive Techniques (New York, NY, USA, 2001), SIGGRAPH '01, ACM, pp. 341-346.

Efros A.; Leung T.: "Texture Synthesis by Nonparametric Sampling". In in International Conference on Computer Vision (1999), pp. 1033-1038.

Fournier A.; Fussell D.; Carpenter L.: "Comuter Rendering of Stochastic Models". Commun. ACM 25, 6 (Jun. 1982), pp. 371-384.

Gain J. E.; Marais P.; Strasser W.: "Terrain Sketching". In S13D (2009), Haines E., McGuire M., Aliaga D. G., Oliveira M. M., Spencer S. N., (Eds.), ACM, pp. 31-38.

Hammes J.: "Modeling of Ecosystems as a Data Source for Real-Time Terrain Rendering". In DEM'01; Proceedings of the First International Symposium on Digital Earth Moving (London, UK, 2011), Springer-Verlag, pp. 98-111.

Lefebvre S.; Hoppe H.: "Parallel Controllable Texture Synthesis". In ACM SIGGRAPH 2005 Papers (New York, NY, USA, 2005), SIGGRAPH '05, ACM, pp. 777-786.

Perlin K.: "An Image Synthesizer". SIGGRAPH Comput. Graph, 19, 3 (Jul. 1985), pp. 287-296.

Perez P.; Gangnet M.; Blake A.: "Poisson Image Editing". In ACM SIGGRAPH 2003 Papers (New York, NY, USA, 2003), SIGGRAPH '03, ACM, pp. 313-318.

Tasse F.; Gain J.; Marais P.: "Enchanced Texture-Based Terrain Synthesis on Graphics Hardware". Comp. Graph. Forum 31, 6 (Sep. 2012), pp. 1959-1972.

Vemuri B. C.; Mandal C.; Lai S. H.: "A Fast Gibbs Sampler for Synthesizing Constrained Fractals". IEEE Trans. Vis. Compat. Graph. 3, 4 (1997), pp. 337-351.

Zhou H.; Sun J.; Turk G.; Rehg J. M.: "Terrain Systhesis From Digital Elevation Models". IEEE Trans. Vis. Comput. Graph, 13, 4 (2007), pp. 834-848.

E Onsoftware: VUE. Http://www.e-onsoftware.com/products/vue/, Sep. 15, 2013.

Software P.: Terragen. Http://planetside.co.uk/products/terragen3/, Sep. 17, 2013.

* cited by examiner

EXAMPLE BASED EDITING OF VIRTUAL TERRAIN MAPS

BACKGROUND

Field of the Invention

Embodiments presented herein provide techniques for creating virtual terrain maps, including example-based editing of virtual terrain maps.

Description of the Related Art

Virtual terrains are used in numerous applications including animation, films, video games, landscape visualization and flight simulators. Modeling such virtual terrains to resemble natural landscapes can be challenging due to the characteristics of natural landscapes. At a macro level, natural landscapes tend to present distinctive geological features such as height, shape, and distribution of roughness. However, at a micro level, natural landscapes are inherently stochastic. These characteristics of natural landscapes make it difficult for artists to manually model virtual terrains by, e.g., extruding elevation meshes.

A variety of procedural approaches have been developed to automatically generate virtual terrains. Such procedural approaches typically take as input user-specified parameter values (e.g., values for noise parameters indicating roughness of the terrain) and generate virtual terrains according to the input parameter values. However, the parameterizations that are used are often unintuitive for artists, with little visual correlation between the input parameter values and the output terrain. Further, artists lack control over the final, automatically generated terrain aside from modifying values of the available parameters. As a result, artists have resorted to an example-based manual approach in which they collect reference and inspiration data from the real world (e.g., sketches, elevation maps, and satellite images) and sculpt virtual terrains using three-dimensional (3D) software packages, in a lengthy and cumbersome process.

SUMMARY

One aspect of the invention provides a computer implemented method for generating a terrain map. The method generally includes receiving one or more assets specifying features of a terrain. The method also includes adding each of the one or more assets to at least one layer, where each layer is configured to store terrain features, and where the layers are overlaid on top of each other. The method further includes receiving one or more edits to the terrain and adding each of the one or more edits to a respective layer. In addition, the method includes blending the layers using a frequency-aware layer blending technique to generate the terrain map.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1:
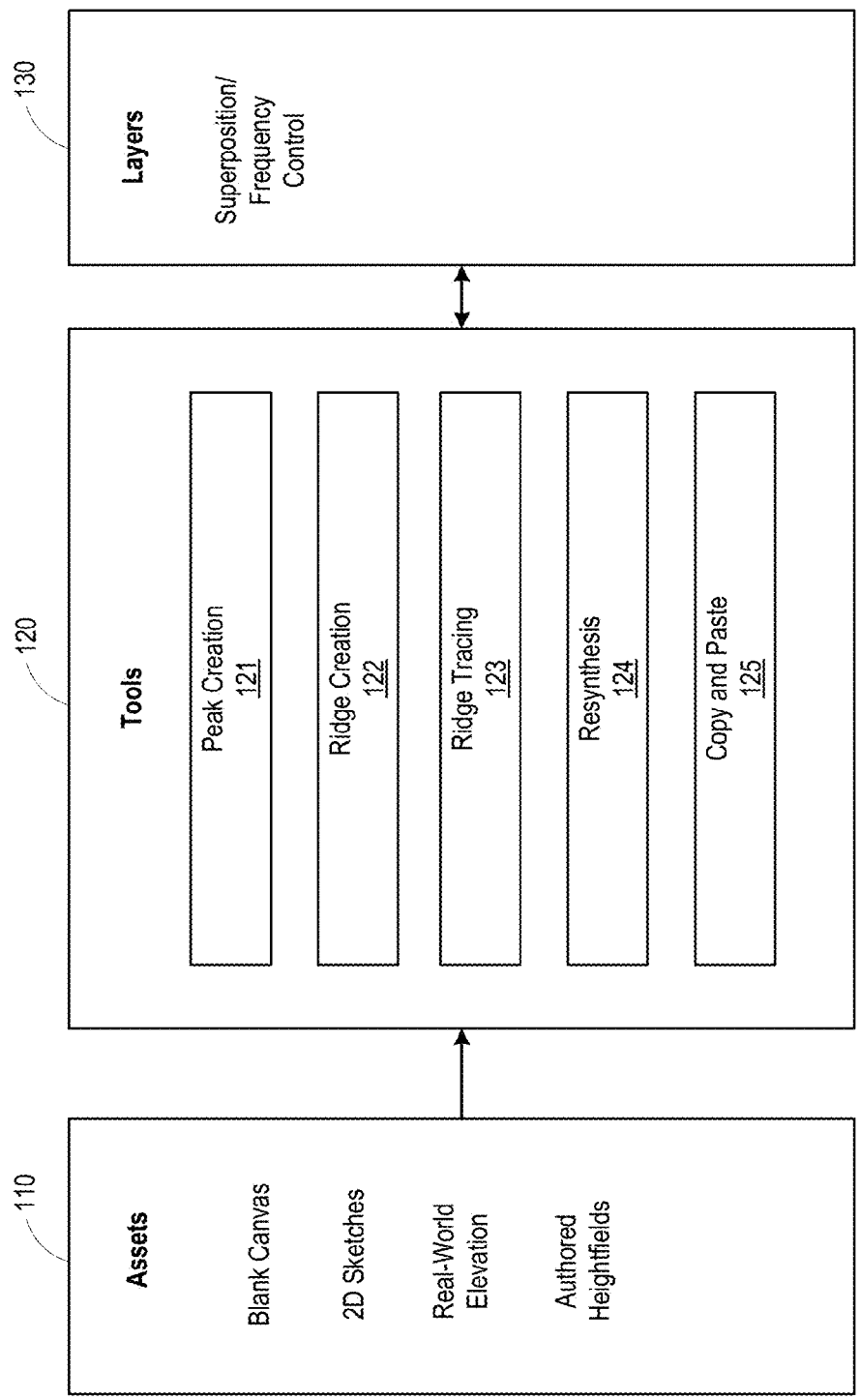
FIG. 1 illustrates an overview of an operation flow for generating a terrain map, according to an embodiment.

Embodiments disclosed herein provide techniques for generating virtual terrains. A terrain editing application ("editing application") is configured to receive asset(s) of various types that specify characteristics of a terrain. As used herein, "terrain" generally refers to any displacement field, including natural landscapes. That is, techniques disclosed herein are applicable to natural landscapes and may also be used for other forms of displacement map editing. The assets received by the terrain editing application may include a blank canvas, two-dimensional (2D) sketches, real-world elevation maps, authored heightfields, and the like. A received asset is added to a new layer and provides the starting point for the terrain-creation workflow. Each layer is configured to store terrain features, and the layers may be overlaid on top of each other in a specific order (e.g., a user-determined order). Experience has shown that artists tend to prefer a workflow that is guided and inspired by such sketches, elevation maps, etc. For example, if the asset is a 2D sketch, then the user may trace ridges in the 2D sketch, and the editing application may then convert the traced ridges to geological features in a terrain elevation map ("terrain map"). Further assets may be added at any point in the terrain-creation workflow. For example, the user may load a real-world elevation map asset that includes a single peak, edit the peak, and then load and edit a second real-world elevation map that includes another peak. The peaks and edits are added to separate layers, and the layers may then be blended via an efficient Laplacian blending technique (or another frequency aware/selective layer blending technique) to generate the final virtual terrain. In another embodiment, the editing application may also provide the user the ability to modify frequencies of each layer (e.g., to emphasize high frequency details, deemphasize low frequency details, etc.), and the editing application may blend the layers with frequency selective Laplacian blending The editing application provides a set of tools that permit the user to modify the terrain map. Use of such tools, in conjunction with the different types of assets and the layering framework, provides a fluid workflow for creating terrains that does not rely on any strict pipeline. In one embodiment, this set of tools may include tools for creating geological features and tools for cutting, copying, and pasting existing geological features. These tools may be chosen to balance complexity and immediate interactivity. The tools for creating geological features may include a peak creation tool, a ridge creation tool, and a ridge tracing tool. The tools for cutting, copying, and pasting existing geological features may include a cutting and texture synthesis tool and a copy-and-paste tool. Experience has shown that such tools make up a minimal tool set that still provides flexibility in editing the terrain and allows for efficient terrain generation.

In one embodiment, the editing application generates a new layer for each edit made to the terrain, as well as updates 2D and 3D previews of the edited terrain. Layers provide a non-destructive editing approach that, together with the tool set discussed above, improves the artist's workflow in creating virtual terrains. The layers themselves may be merged or deleted, as desired. As used herein, "merging" generally refers to creating single, merged layer which includes the features of multiple layers being merged. As discussed, in one embodiment the editing application may also provide the user the ability to modify frequencies of each layer, and the editing application may then blend the layers with frequency selective Laplacian blending. The final virtual terrain may be the result of such blending.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

FIG. 1 illustrates an overview of an operation flow for generating a terrain map, according to an embodiment. As shown, various types of assets 110 may be taken as inputs. For example, the input asset(s) may include one or more blank canvases, 2D sketches, authored heightfields, and real-world elevation maps. That is, real-world assets such as elevation maps, as well as sketches such as concept art, may be input as the starting point for creating the virtual terrain. This comports with artists' typical workflow, in which they begin with photographs, sketches, elevation maps and satellite images as inspiration. Further assets may be added at any point of the terrain-creation workflow, thereby helping to provide a fluid workflow that does not rely on a strict pipeline.

In addition to taking various asset(s) 110 as the starting point, the editing application also provides a number of tools 120 for editing the virtual terrain. Illustratively, the tools 120 include simple tools such as a copy and paste tool 125, as well as higher level and landscape-specific tools such as a peak creation tool 121, a ridge creation tool 122, a ridge tracing tool 123, and a resynthesis tool 124. These tools may are chosen to balance complexity and immediate interactivity, with some tools being less complex and more immediate (e.g., the copy and paste and peak creation tools) and some tools being more complex and less immediate (e.g., the resynthesis tool and the ridge tracing tool). In general, the peak creation tool 121 may permit users to add peaks on top of existing terrains. The ridge creation tool 122 may permit users to add a ridge by sketching a ridge line and indicating a height profile, while the ridge tracing tool 123 may permit uses to add ridges using an example-based sketching of ridge profiles and baselines onto a 3D plane. The resynthesis tool 123 fills in, based on image quilting, regions that are cut out of the terrain. And the copy and paste tool 125 allows users to replicate terrain features and transfer textures.

As shown, the assets are added to respective layers and edits are made to different layers 130, with all of the layers superposed on top of each other. In one embodiment, the editing application may create a new layer for each edit made using one of the tools 120. Use of layers provides a non-destructive editing approach, and the layers themselves may be merged or deleted, as desired. In one embodiment, Laplacian image blending may be used to combine layers in a plausible way to generate the final terrain. In another embodiment, the editing application may decompose each layer into a number of frequency bands (e.g., three frequency bands) using a Laplacian pyramid representation, and the user may be allowed to blend between layers while separately controlling the strength of each frequency band's contribution within its layer to, e.g., emphasize high frequency details, deemphasize low frequency details, etc. In yet another embodiment, the editing application may generate 2D and 3D live previews that are updated in real time as edits are made, as discussed in greater detail below.

Figure 2:
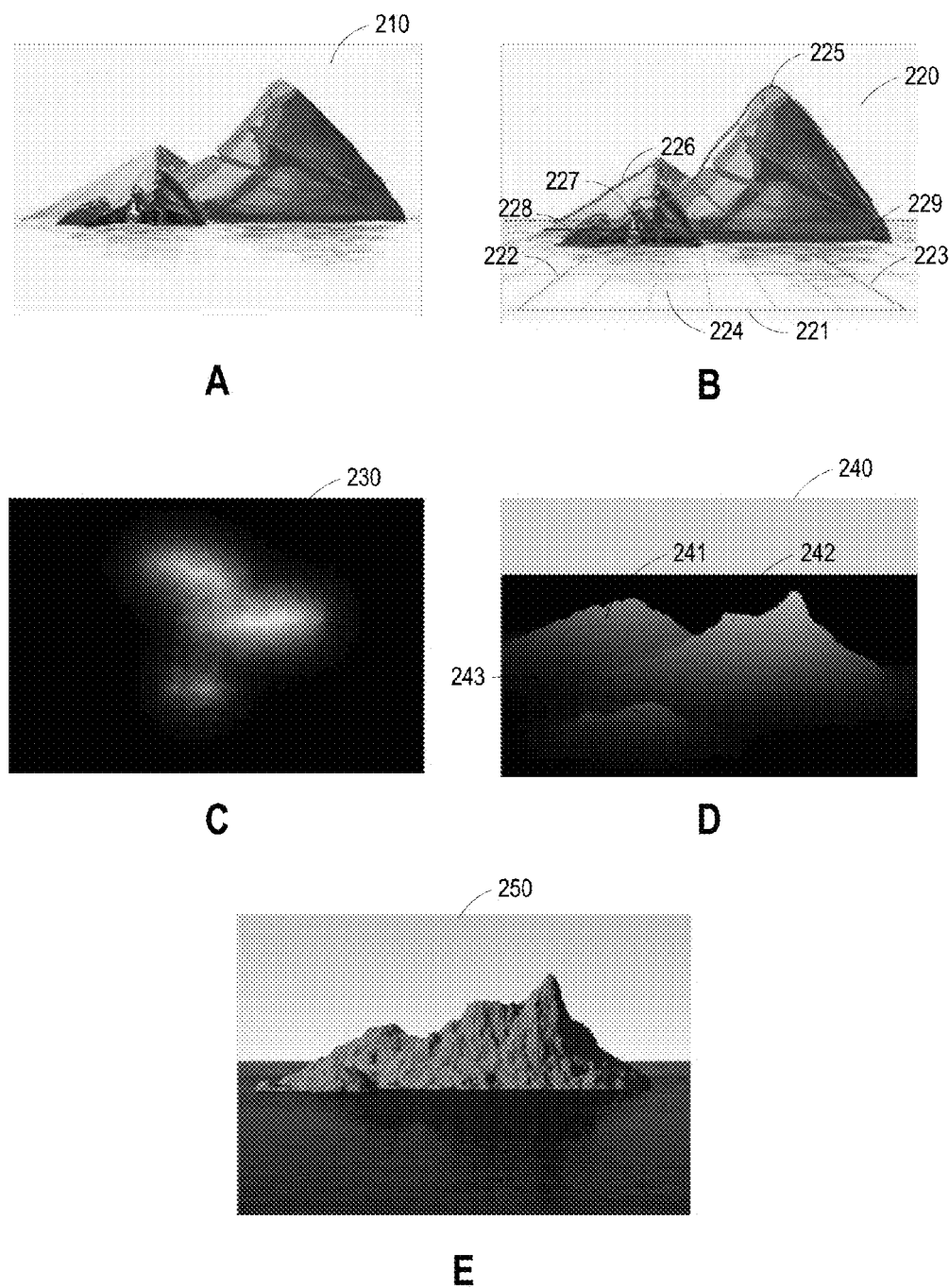
FIG. 2 illustrates generating a terrain map from a 2D sketch, according to an embodiment.

FIG. 2 illustrates generating a terrain map from a 2D sketch, according to an embodiment. Panel A shows a 2D concept sketch 220 that is input to the editing application as a starting point for generating the terrain map. The editing application may provide a ridge tracing tool for extracting terrain features. The ridge tracing tool may generally provide an interface for example-based sketching of ridge profiles and baselines onto a 3D plane. Such an interface may permit the user to load concept art, a sketch, a photograph of a 3D scene, or the like to act as guidance (i.e., to act as the example).

As shown in panel B, the editing application may overlay a grid 224 onto the 3D canvas, indicating the perspective mapping of a virtual ground plane. Different input images may have different distortions, and the perspective mapping allows the user to control how stretched out the terrain is in depth space. The gradient of perspective foreshortening/falloff is controlled in this way, which is in some sense a coarse level single edit 2D or 3D conversion that is user-guided to resolve ambiguity and artistic control. The editing application may permit the user to adjust the perspective mapping by, e.g., dragging a horizontal line 221 and two grid lines 222-223 until the grid's perspective corresponds to the input image. The user may then trace ridge lines 225-227 indicating an elevation profile of the ridge as well as lines 228-229 indicating the base of the ridge. That is, the editing application allows the user to fully define a ridge with both an elevation profile and a baseline shape. In addition, the elevation and base lines may remain editable, allowing repeated corrections by the user until the synthesized ridge landscape resembles the input sketch 220.

Given the ridge base and elevation profile traced by the user, the editing application may dynamically insert a mountain ridge which has the same height as the traced profile and has Gaussian fall-off, with a standard deviation proportional to the height of the ridge. That is, the higher the elevation, the greater the horizontal spread, and vice versa. Panels C-D show a top view 230 and a side view 240 of a heightmap for mountain ridges generated from the ridge base and elevation lines traced in panel B. Illustratively, texture has also been added to the mountains so that the mountains 241-243 are not as smooth as mountains generated directly from the traced ridge lines in panel B without adding texture. For example, the editing application may permit the user to add Perlin noise to the terrain. The editing application also may permit texture to be added by blending and manual transfer of texture. For example, a user may wish to add a rocky texture to otherwise smooth hills, and the editing application may permit the user to copy or transfer the desired rocky texture from another heightfield. Such a transferred texture may be made to a new layer, and the editing application may also give the user control over frequency of detail using, e.g., sliders for high, medium, and low level of detail.

Panel E shows a rendered image 250 of the terrain with the heightfield 240. In one embodiment, the editing application may provide 2D and 3D live previews that update in real time during each edit, as interactivity is an important of the artistic workflow. The heightfield 240 may be such a 2D preview and the rendered image 250 may be such a 3D live preview.

Figure 3:
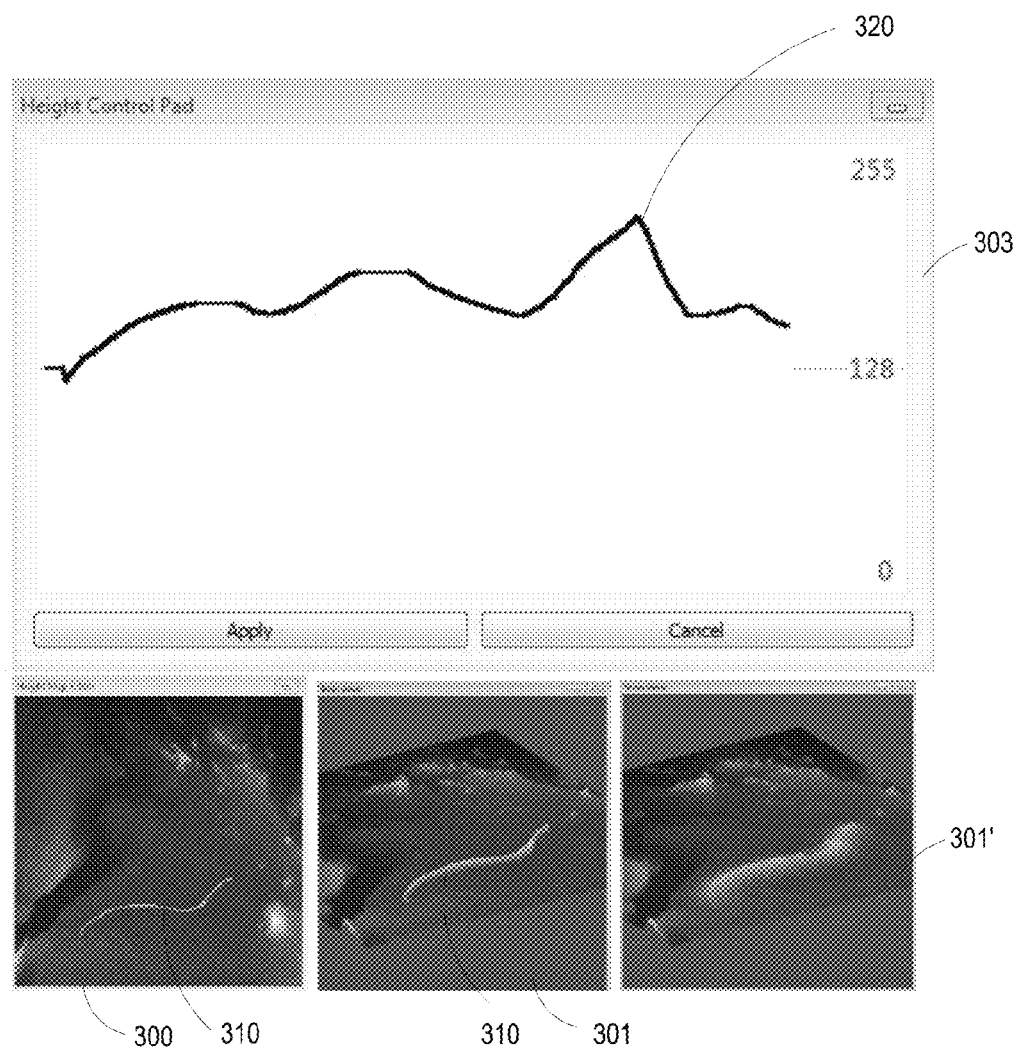
FIG. 3 illustrates an example ridge creation tool, according to an embodiment.

FIG. 3 illustrates an example ridge creation tool, according to an embodiment. As previously discussed, a user may trace ridges using input concept art, a sketch, a photograph of a 3D scene, or the like as a reference. FIG. 3 illustrates a different approach for creating ridges in which a reference is not used. As shown, the editing application provides an interface 300 that depicts the elevation map of a terrain in 2D. The user sketches a line 310 on such a terrain to indicate the location of a base of a ridge. This same line 310 is then also presented in a 3D rendering interface 301. The user further indicates a height profile of the ridge 320 in another interface 303 provided by the editing application. Given the ridge base and the height profile, the editing application may dynamically insert a mountain ridge that has a Gaussian fall-off with a standard of deviation proportional to the ridge height at every point, similar to the discussion above. As shown, such a mountain ridge is then presented in the 3D rendering interface 302.

Figure 4:
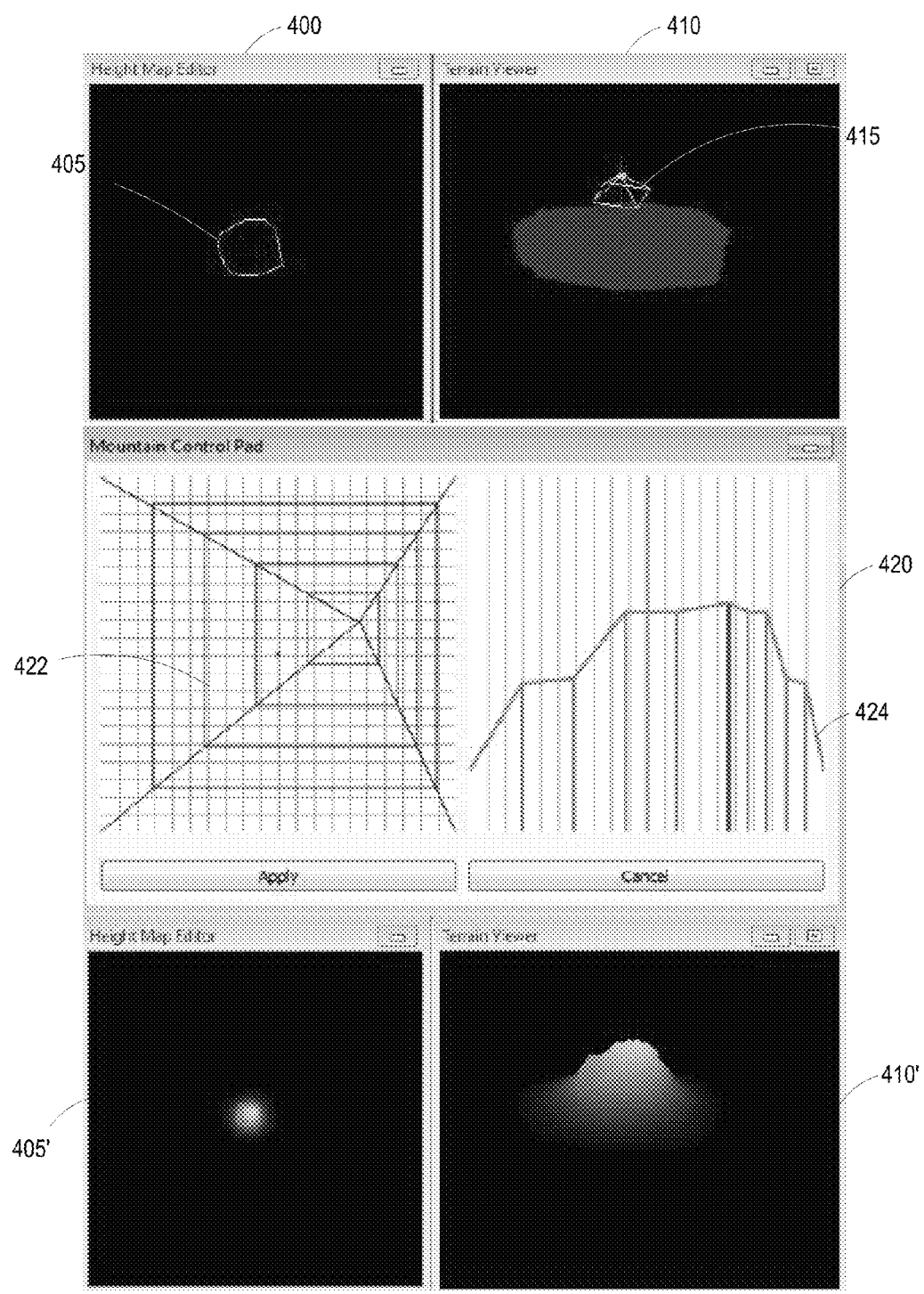
FIG. 4 illustrates an example peak creation tool, according to an embodiment.

FIG. 4 illustrates an example peak creation tool, according to an embodiment. The peak creation tool may generally permit users to add peaks on top of existing terrain. As shown, a user first draws the base 405 of a new peak on a 2D heightmap. Illustratively, the base 405 is drawn on a blank canvas 400. However, the base 405 may generally be drawn on a heightmap associated with the existing terrain.

In addition to specifying the base 405 of the new peak, the user also sets the height of the peak 415 in a 3D interface 410. Given the specified base 405 and peak 415, the editing application may add a Gaussian-shaped peak having a corresponding height and standard deviation. In one embodiment, the new peak is added in a new layer on top of existing terrain layers. In another embodiment, the added layer affects the low-frequency content of the terrain, while higher frequencies that correspond to more detailed terrain features are taken from the previous layers.

Illustratively, the editing application also provides an additional dialogue interface 420 which shows a top-down view 422 of the peak and a cross-sectional view 424 of the peak. The user may interactively change skewness and kurtosis of the new peak in the top-down view 422 and trace a desired profile of the peak in the cross-sectional view 424. The result of such changes is reflected in the 2D interface 405' showing an updated heightmap and the 3D interface 410' showing an updated rendering of the peak.

Figure 5:
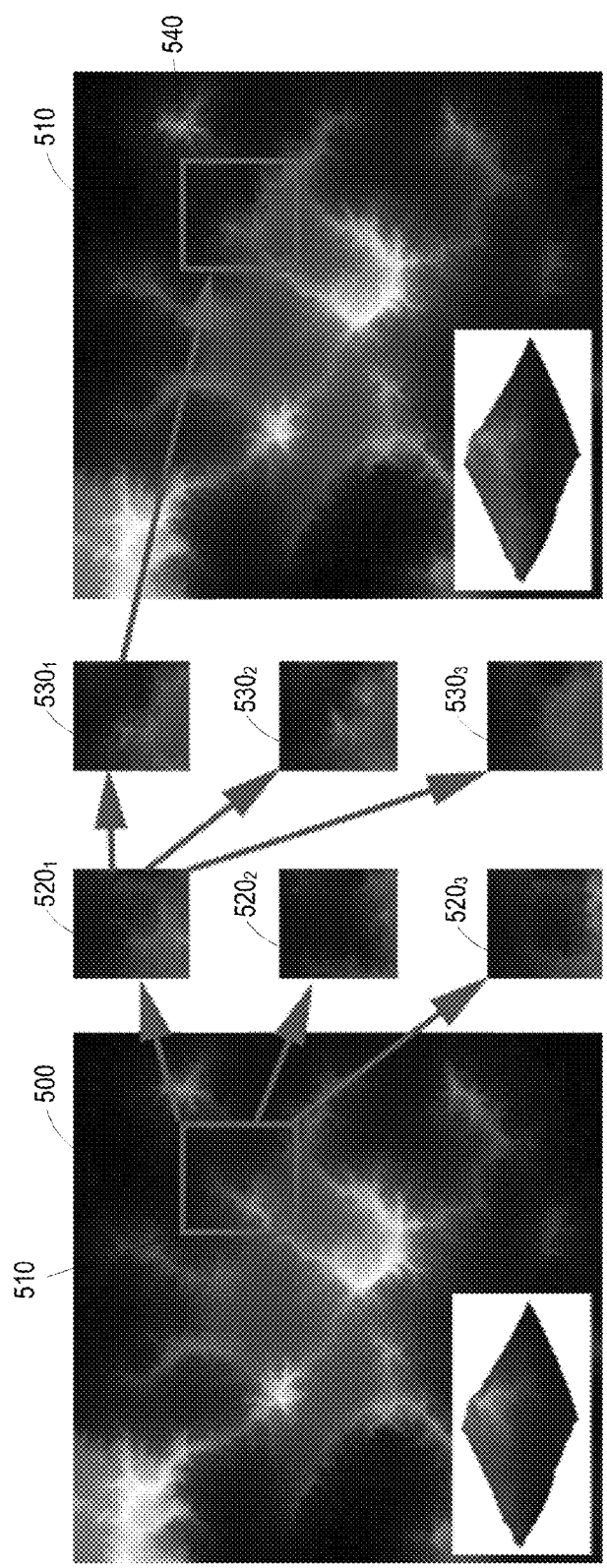
FIG. 5 illustrates an example of automatically generating multiple versions of terrain, according to an embodiment.

FIG. 5 illustrates an example of automatically generating multiple versions of terrain, according to an embodiment. Experience has shown that, with automatically generated terrain, artists prefer to be presented with multiple versions of such terrain and pick suitable instance(s). Providing multiple versions of terrain also permits greater variability, which may result in more natural and plausible terrain.

Illustratively, terrain is automatically generated to fill in a region 510 of a terrain 500 that is being cut out. As shown, the editing application automatically generates three versions $520_{1-3}$ of terrain to fill in the region 510. In one embodiment, the editing application may use a modified texture synthesis approach based on image quilting to generate the three versions $520_{1-3}$ of the terrain. In such a case, the editing application must not only consider constraints on neighboring pixels but also enforce initial boundary constraints. Traditional scan-line approaches tend to leave artifacts at the boundaries where residual error from patch matching accumulates. In one embodiment, a spiraling technique may be used to distribute such residual error more evenly across the synthesized region. The three versions $520_{1-3}$ of terrain may be generated by synthesizing the new region three times according to such a modified texture synthesis approach. As shown, the editing application further allows the user to resynthesize the region based on the chosen version $520_1$ of the terrain, preserving the structure of the chosen version $520_1$ but providing variations $530_{1-3}$. This process may be repeated, while providing the user the ability to return to previous and alternative versions, as desired. The editing application may then blend the final region 540 into the original height map 510 using Laplacian pyramids.

Figure 6:
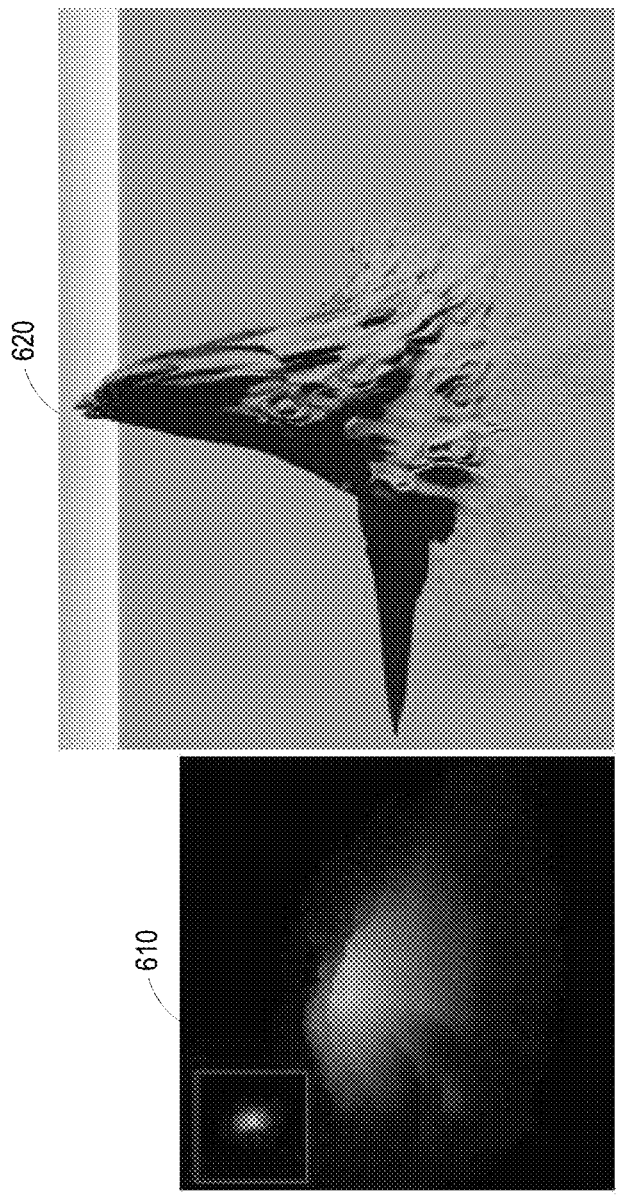
FIG. 6 illustrates an example copy and paste tool, according to an embodiment.

FIG. 6 illustrates an example copy and paste tool, according to an embodiment. The copy and paste function generally allows the user to replicate terrain features from a variety of sources on a virtual terrain. For example, editing application may permit the user to select features in the 2D interface 610 and replicate the selected features by dragging those features to new locations. As another example, the user may copy features from another heightmap, such as a heightmap of real-world terrain, and paste those features to a new layer.

In one embodiment, the editing application may also give the user the option to mix the features of the source and target regions. As discussed, the editing application may use mixed gradient blending to merge the two regions, taking the highest gradient pixel from either region. Doing so preserves characteristics from both the source and destination regions.

In another embodiment, the editing application may also permit textures to be copied and pasted from one terrain to another. Such texture transfer may solve two issues: firstly, the mountain peaks and ridges generated by the system may initially look unrealistic due to the lack of texture; secondly, the user may want to alter the texture of a particular region to make it appear more similar to another location. For example, the user may want to add rocky texture to otherwise smooth hills, and the editing application may provide a texture transfer interface which can be used to copy or transfer the desired texture from, e.g., another heightfield. In yet another embodiment, the editing application may provide the user the ability to control frequency of detail that is placed with, e.g., a set of sliders for high, medium, and low level of detail. For example, the user may move the sliders so that only high (or medium or low) frequency detail is transferred.

Figure 7:
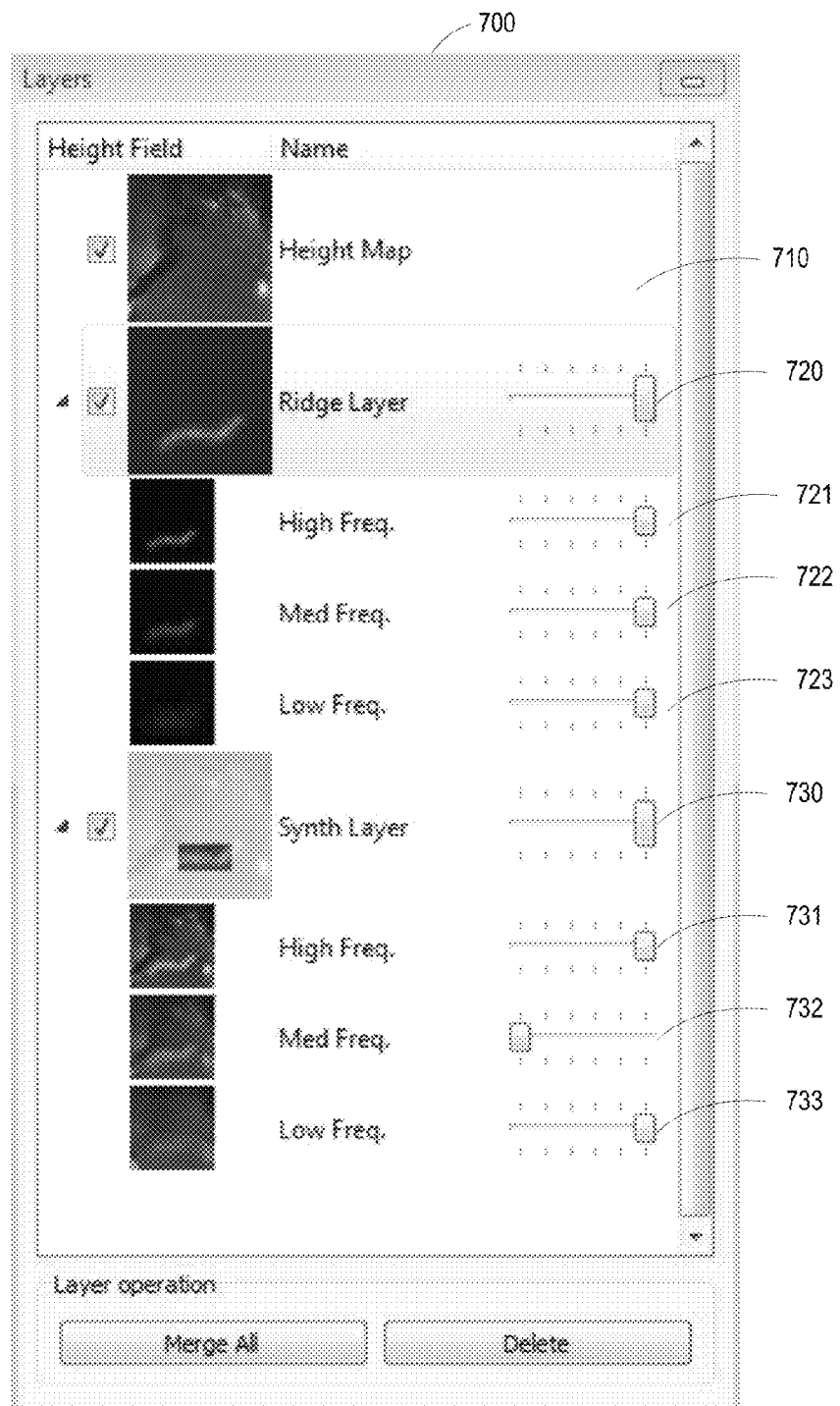
FIG. 7 illustrates an example layer control interface, according to an embodiment.

FIG. 7 illustrates an example layer control interface 700, according to an embodiment. As shown, the layer control interface 700 presents the layers of a virtual terrain, including a height map layer 710, a ridge layer 720, and a texture synthesis layer 730. In this case, the user may have initially loaded a height map asset and added a ridge (using, e.g., the ridge creation tool discussed above), and then cut out a region that was automatically filled back in (using, e.g., the texture synthesis technique discussed above). The editing application may automatically generate a new layer for the initial heightmap asset and each of the subsequent edits made to the terrain. Of course, one or more assets or edits may also be added to the same layer in another embodiment.

As shown, the layer control interface 700 permits the user to merge and delete layers, as desired. In one embodiment, the editing application may use Laplacian image blending to combine layers in a manner that is plausible for terrains to generate the final terrain. Experience has shown that Laplacian blending tends to ensure seamless boundaries and is faster than other commonly used techniques such as Poisson image editing and Shepard Interpolation.

Illustratively, the layer control interface 700 also presents frequency decompositions for the ridge layer 720 and the texture synthesis layer 730. In one embodiment, a Laplacian pyramid representation may be used to decompose the layers into three-band frequency decompositions. Such a Laplacian pyramid representation permits real-time reconstruction as the user moves blending sliders. As shown, the ridge layer 720 is decomposed into a high frequency band 721, a medium frequency band 722, and a low frequency band 723. Three frequency bands are used, as experience has shown that separating into more than three frequency bands provides little additional advantage.

Figure 8:
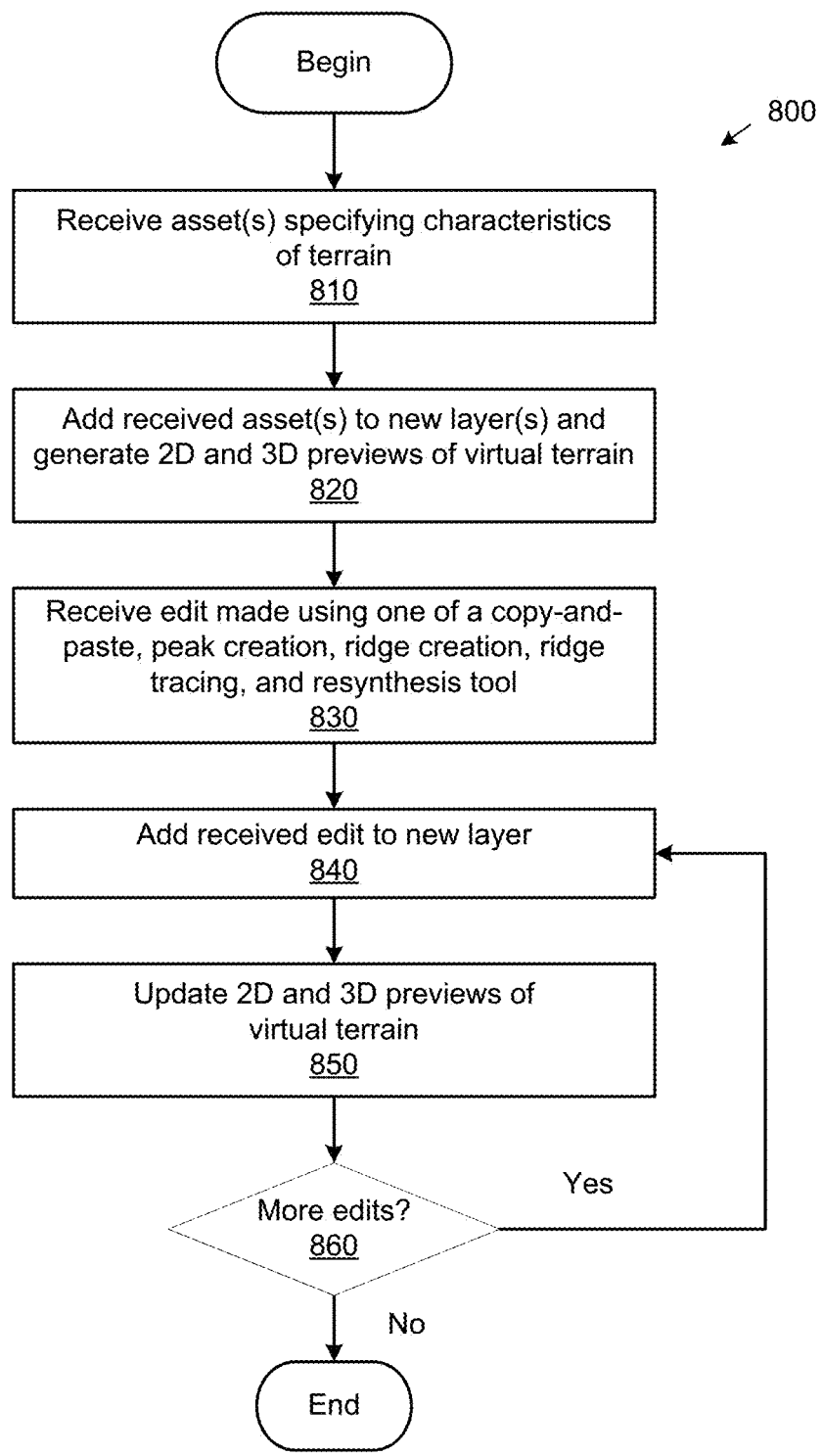
FIG. 8 illustrates a method for generating a terrain map, according to an embodiment.

FIG. 8 illustrates a method 800 for generating a terrain map, according to an embodiment. As shown, the method 800 begins at step 810, where the editing application receives asset(s) specifying characteristics of a terrain. As discussed, the received asset(s) provide the starting point for creating the virtual terrain. In one embodiment, the editing application may accept a variety of assets as input, such as a blank canvas, a photograph, a concept terrain sketch, and an elevation map. Doing so comports with artists' typical workflow, in which they often begin with photographs, sketches, elevation maps and satellite images as inspiration.

At step 820, the editing application adds the received asset(s) to new layer(s) and generates 2D and 3D previews of virtual terrain. As discussed, use of layers provides a non-destructive editing framework and the layers may be blended with frequency selective Laplacian blending which allows for fine control of each layer's effect on the virtual terrain. The editing application also provides 2D and 3D live previews that may update in real time, as interactivity is typically important to the artistic workflow. In one embodiment, the 2D preview may be a top-down view of a heightmap for the terrain, and the 3D preview may be a rendered image of the terrain.

Note, although the steps 810-820 of receiving asset(s) and adding the asset(s) to layer(s) is depicted as occurring before the steps 830-840 of receiving edits and adding the edits to new layers, assets may generally be received and added to new layers at any point in the terrain-creation workflow. This helps provide a fluid workflow that does not rely on a strict pipeline. For example, the user may load a real-world elevation map asset that includes a single peak, edit the peak, and then load and edit a second real-world elevation map that includes another peak. As discussed, the peaks and edits are added to separate layers which may be blended to generate the final virtual terrain.

At step 830, the editing application receives terrain edits made using one of the following tools: a ridge creation tool, a ridge tracing tool, a peak creation tool, a copy-and-paste tool, and a resynthesis tool. Given the received asset(s) as the starting point, the editing application permits the user to add detail and geological features by using these tools, which are chosen to balance complexity and immediate interactivity. Further, experience has shown that these tools provide a minimum set of tools that still bears relatively maximal flexibility and that allows for efficient terrain generation. As discussed, the ridge creation tool may generally permit the user to add a ridge by, e.g., sketching a ridge line and a height profile. The ridge tracing tool may also permit the user to add a ridge, but using example-based sketching of ridge profiles and baselines onto a 3D-plane. The peak creation tool generally permits the user to add a peak on top of existing terrain. The copy-and-paste tool generally permits the user to replicate geological features by, e.g., selecting desired features in a 2D interface and dragging the features to new locations. The resynthesis tool generally permits the user to automatically generate regions of terrain using texture synthesis to, e.g., fill in cut out regions.

At step 840, the editing application adds the received edit to a new layer. As discussed, layers provide a non-destructive editing approach that facilitates, and the editing application may create a new layer for each received edit. The editing application may further permit the user to merge and delete layers via a layer control interface, such as that depicted in FIG. 7. In one embodiment, the editing application may combine the layers using a Laplacian blending technique to generate the final terrain map. In another embodiment, each layer may be decomposed using a Laplacian pyramid representation into a three-band frequency decomposition, and the editing application may permit the user to selectively blend between layers in a manner similar to alpha-blending, while separately controlling the strength of each frequency band's contribution within its layer.

At step 850, the editing application updates the 2D and 3D previews of the virtual terrain. As discussed, interactivity is typically important to the artistic workflow. The editing application may thus provide 2D and 3D live previews that update in real time. For example, the 2D preview may be a top-down view of a heightmap for the terrain, and the 3D preview may be a rendered image of the terrain. Use of Laplacian blending and other techniques discussed herein which are computationally efficient permit such real-time reconstruction.

At step 860, if the user makes more edits, then the method 800 returns to step 840, where the editing application creates yet another new layer for each new edit.

Figure 9:
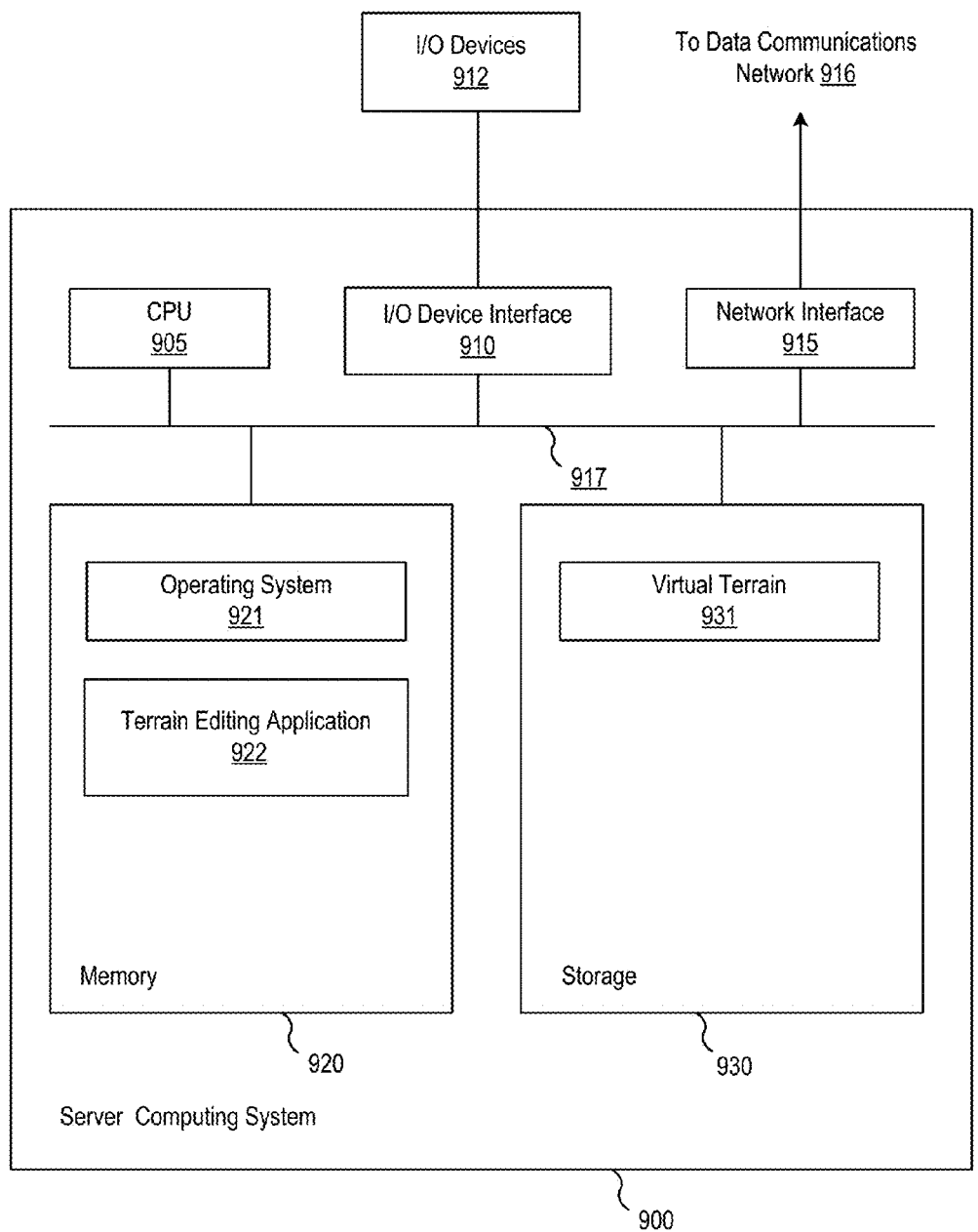
FIG. 9 illustrates a system in which an embodiment may be implemented.

FIG. 9 illustrates a system 900 in which an embodiment may be implemented. As shown, the system 900 includes a central processing unit (CPU) 905, a network interface 915, an interconnect 917, a memory 960, and storage 920. The system 900 may also include an I/O device interface 910 connecting I/O devices 912 (e.g., keyboard, display and mouse devices) to the system 900.

The CPU 905 retrieves and executes programming instructions stored in the memory 920. Similarly, the CPU 905 stores and retrieves application data residing in the memory 920. The interconnect 917 facilitates transmission, such as of programming instructions and application data, between the CPU 905, I/O device interface 910, storage 930, network interface 915, and memory 920. CPU 905 is included to be representative of a single CPU, multiple CPUs, a single CPU having multiple processing cores, and the like. And the memory 920 is generally included to be representative of a random access memory. The storage 930 may be a disk drive storage device. Although shown as a single unit, the storage 930 may be a combination of fixed and/or removable storage devices, such as tape drives, removable memory cards or optical storage, network attached storage (NAS), or a storage area-network (SAN). Further, system 900 is included to be representative of a physical computing system as well as virtual machine instances hosted on a set of underlying physical computing systems. Further still, although shown as a single computing system, one of ordinary skill in the art will recognized that the components of the system 900 shown in FIG. 9 may be distributed across multiple computing systems connected by a data communications network.

As shown, the memory 960 includes an operating system 961 and a terrain editing application 962. Illustratively, the operating system 961 may include Microsoft's Windows®. The terrain editing application 962 is configured to receive as input various types of asset(s) and provide a set of tools for editing a virtual terrain 931, which as shown in stored in the storage 930. The tools may include a ridge creation tool, a ridge tracing tool, a peak creation tool, a copy-and-paste tool, and a resynthesis tool. In one embodiment, the terrain editing application 962 may receive edits made using these tools, create a new layer for each edit, and generate live 2D and 3D previews that update in real time, according to the method 800 discussed above.

Although discussed above primarily with respect to Laplacian blending, other embodiments may employ frequency aware/selective layer blending techniques other than Laplacian blending. Although discussed above with respect to certain interfaces, alternative embodiments may use different interfaces. For example, some edits made using 2D interfaces, discussed above, may be made using 3D interfaces in other embodiments. Although discussed above with respect to a terrain map of a fixed size, some embodiments may permit the size of the terrain map to be expanded. For example, the terrain map size may be increased by applying texture synthesis as the boundaries based on features and patches found on the canvas.

Advantageously, techniques disclosed herein provide a flexible and efficient workflow for creating virtual terrains that can be used in animations, video games, among other things. A terrain editing application is configured to take as input various assets, providing a variety of starting points for creating the virtual terrains. The assets may include real-world data such as elevation maps that can be integrated into the virtual terrain. The assets may also include sketches such as concept art that provide examples from which the virtual terrain is generated, thereby bridging the gap between 2D concept art and 3D terrains. Editing tools discussed herein, including the ridge creation tool, the ridge tracing tool, the peak creation tool, the copy-and-paste tool, and the resynthesis tool, provide a minimum set of tools that still permits flexibility and allows for efficient terrain generation, without relying on implicit parameterization as in traditional techniques. In addition, the terrain editing application creates a new layer for each edit made with such tools, providing a non-destructive editing approach that also allows for fine control of the effects of each edit on the terrain through frequency selective Laplacian blending.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A computer-implemented method for generating a virtual terrain, comprising:

receiving one or more assets specifying characteristics of a terrain;

adding each of the one or more assets to at least one layer, wherein each layer is configured to store geological features as a displacement field, wherein the virtual terrain is generated using overlapping displacement fields representing geological features from respective layers, and wherein the layers are overlaid on top of each other;

receiving one or more edits to the virtual terrain, wherein the one or more edits are made to create peaks, create or trace ridges, synthesize terrain texture, and/or copy and paste geological features;

adding each of the one or more edits to a respective layer; and blending the displacement fields representing the geological features stored in the layers using a frequency-aware layer blending technique to generate the virtual terrain, wherein the frequency-aware layer blending technique is a Laplacian blending technique applied to blend the displacement fields representing the geological features stored in the layers based on at least one or more user-specified strengths of frequency band contributions within the layers.

2. The method of claim 1, wherein synthesizing the terrain texture includes generating one or more portions of the virtual terrain using patch-based texture synthesis, with residual error in the patch-based texture synthesis being spread across patches.

3. The method of claim 2, wherein generating the one or more portions of the virtual terrain includes:

generating one or more alternatives of each of the one or more portions of the virtual terrain;

presenting the alternatives to a user; and accepting a user-selected one of the alternatives for each of the one or more portions of the virtual terrain.

4. The method of claim 1, wherein the assets include one or more of a 2D concept art, a blank canvas, a real-world elevation map, and an authored heightfield.

5. The method of claim 1, further comprising, providing a user-adjustable frequency decomposition of each layer.

6. The method of claim 5, wherein the frequency decomposition decomposes each layer into high frequency, medium frequency, and low frequency bands.

7. The method of claim 1, further comprising, updating, in real time, a 2D depiction of the virtual terrain and a 3D rendering of the virtual terrain that are presented to a user.

8. A non-transitory computer-readable storage medium storing a program, which, when executed by a processor performs operations for generating a virtual terrain, the operations comprising:

receiving one or more assets specifying characteristics of a terrain;

adding each of the one or more assets to at least one layer, wherein each layer is configured to store geological features as a displacement field, wherein the virtual terrain is generated using overlapping displacement fields representing geological features from respective layers, and wherein the layers are overlaid on top of each other;

receiving one or more edits to the virtual terrain, wherein the one or more edits are made to create peaks, create or trace ridges, synthesize terrain texture, and/or copy and paste geological features;

adding each of the one or more edits to a respective layer; and blending the displacement fields representing the geological features stored in the layers using a frequency-aware layer blending technique to generate the virtual terrain, wherein the frequency-aware layer blending technique is a Laplacian blending technique applied to blend the displacement fields representing the geological features stored in the layers based on at least one or more user-specified strengths of frequency band contributions within the layers.

9. The computer-readable storage medium of claim 8, wherein synthesizing the terrain texture includes generating one or more portions of the virtual terrain using patch-based texture synthesis, with residual error in the patch-based texture synthesis being spread across patches.

10. The computer-readable storage medium of claim 9, wherein generating the one or more portions of the virtual terrain includes:
generating one or more alternatives of each of the one or more portions of the virtual terrain;
presenting the alternatives to a user; and
accepting a user-selected one of the alternatives for each of the one or more portions of the virtual terrain.

11. The computer-readable storage medium of claim 8, wherein the assets include one or more of a 2D concept art, a blank canvas, a real-world elevation map, and an authored heightfield.

12. The computer-readable storage medium of claim 8, the operations further comprising, providing a user-adjustable frequency decomposition of each layer.

13. The computer-readable storage medium of claim 12, wherein the frequency decomposition decomposes each layer into high frequency, medium frequency, and low frequency bands.

14. The computer-readable storage medium of claim 8, the operations further comprising, updating, in real time, a 2D depiction of the virtual terrain and a 3D rendering of the virtual terrain that are presented to a user.

15. A system, comprising:
a processor; and
a memory, wherein the memory includes an application program configured to perform operations for generating a virtual terrain, the operations comprising:
receiving one or more assets specifying characteristics of a terrain,
adding each of the one or more assets to at least one layer, wherein each layer is configured to store geological features as a displacement field, wherein the virtual terrain is generated using overlapping displacement fields representing geological features from respective layers, and wherein the layers are overlaid on top of each other,
receiving one or more edits to the virtual terrain, wherein the one or more edits are made to create peaks, create or trace ridges, synthesize terrain texture, and/or copy and paste geological features,
adding each of the one or more edits to a respective layer, and
blending the displacement fields representing the geological features stored in the layers using a frequency-aware layer blending technique to generate the virtual terrain, wherein the frequency-aware layer blending technique is a Laplacian blending technique applied to blend the displacement fields representing the geological features stored in the layers based on at least one or more user-specified strengths of frequency band contributions within the layers.

16. A computer-implemented method for generating a virtual terrain, comprising:
receiving one or more assets specifying terrain features;
adding each of the one or more assets to at least one layer, wherein each layer is configured to store displacement field features of the virtual terrain, wherein the features of the virtual terrain include features from respective layers, and wherein the layers are overlaid on top of each other;
receiving one or more edits to the virtual terrain, wherein the one or more edits are made to create peaks, create or trace ridges, synthesize terrain texture, and/or copy and paste terrain features;
adding each of the one or more edits to a respective layer; and
blending the displacement field features stored in the layers using a frequency-aware layer blending technique to generate the virtual terrain, wherein the frequency-aware layer blending technique is a Laplacian blending technique applied to blend the displacement field features stored in the layers based on at least one or more user-specified strengths of frequency band contributions within the layers.

* * * * *